(12) United States Patent
Grimm et al.

(10) Patent No.: US 6,378,936 B1
(45) Date of Patent: Apr. 30, 2002

(54) VEHICLE ROOF

(75) Inventors: Rainer Grimm; Carmelo Mondello, both of Frankfurt (DE)

(73) Assignee: Meritor Automotive GmbH (DE)

( * ) Notice: Subject to any disclaimer, the term of this patent is extended or adjusted under 35 U.S.C. 154(b) by 0 days.

(21) Appl. No.: 09/670,237

(22) Filed: Sep. 28, 2000

(30) Foreign Application Priority Data

Sep. 30, 1999 (DE) .......................... 199 47 238

(51) Int. Cl.[7] .......................... B62D 25/00; B60R 13/02
(52) U.S. Cl. .................. 296/214; 296/210; 296/216.08
(58) Field of Search ................. 296/210, 214, 296/107.06, 216.08

(56) References Cited

U.S. PATENT DOCUMENTS

| | | | | |
|---|---|---|---|---|
| 3,505,772 A | * | 4/1970 | De Claire | 296/39.1 X |
| 4,337,974 A | * | 7/1982 | Kohlpaintner et al. | 296/214 |
| 6,158,796 A | * | 12/2000 | Weber | 296/39.1 |

FOREIGN PATENT DOCUMENTS

| | | | | |
|---|---|---|---|---|
| DE | 004206255 | * | 9/1993 | 296/214 |
| EP | 248240 | * | 12/1987 | 296/214 |
| JP | 0194163 | * | 11/1982 | 296/214 |

* cited by examiner

Primary Examiner—Dennis H. Pedder
(74) Attorney, Agent, or Firm—Carlson, Gaskey & Olds

(57) ABSTRACT

A vehicle roof intended in particular for motor vehicles and in particular a roof module (1) to be made separately from the bodywork (5) and to be combined with the bodywork, consisting essentially of a rigid roof skin, where appropriate with an applied foamed inner skin (3) made from plastics foam, and a decorative headliner (12) made from plastics foam. The roof module can be fitted with an integral sliding roof unit. The characteristic feature is that the headliner (12) is made separately from the roof module (1) and can be locked into place on to or released from the inner skin (3) or where appropriate the sliding roof frame of the sliding roof unit by means of complementary exactly fitted interlocking elements (9, 16), i.e. it can be exchanged.

10 Claims, 4 Drawing Sheets

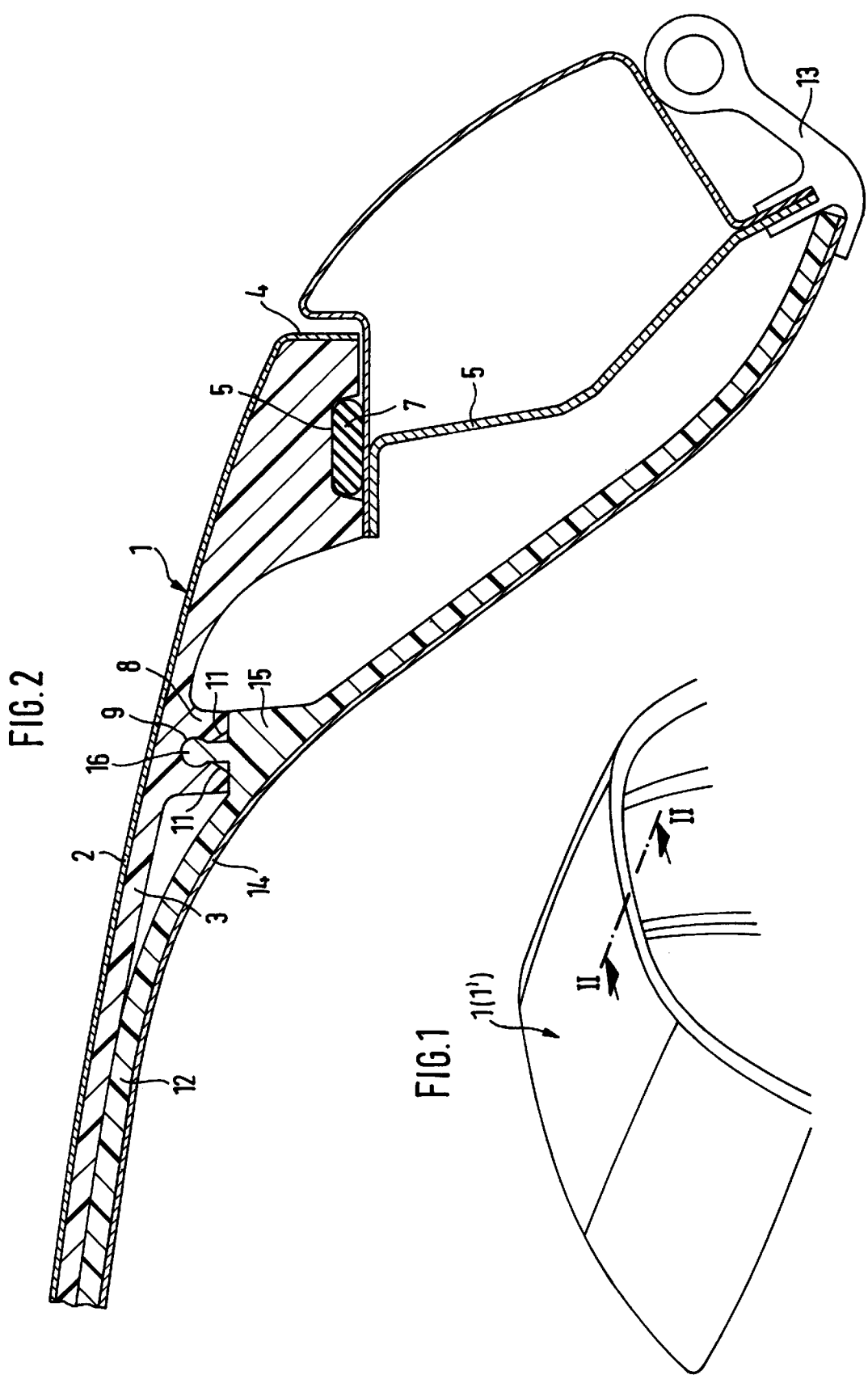

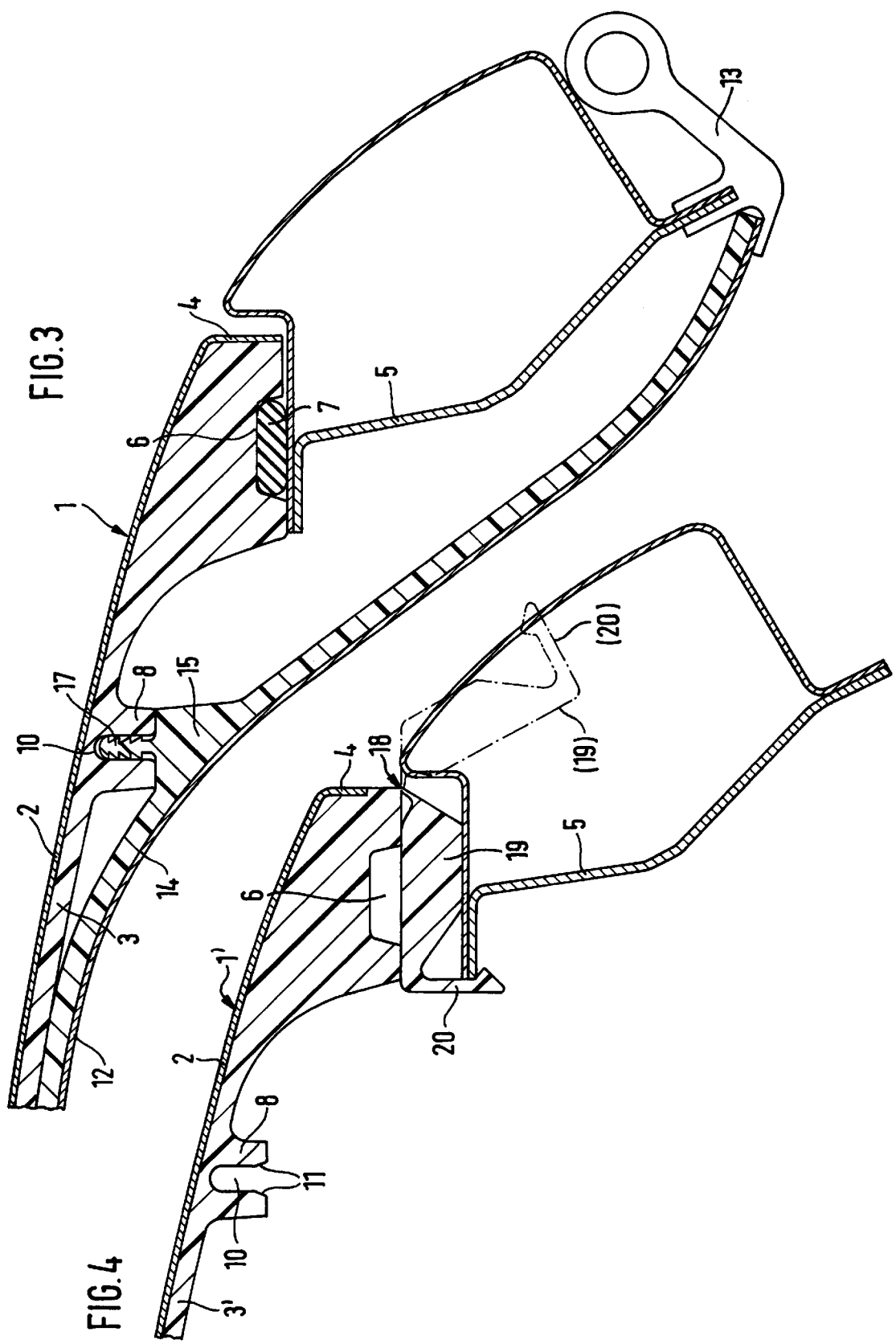

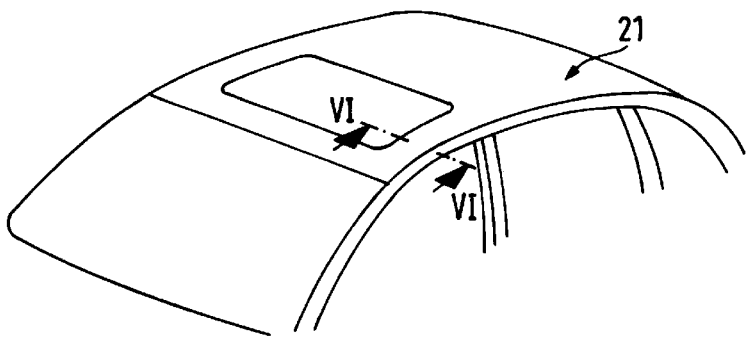
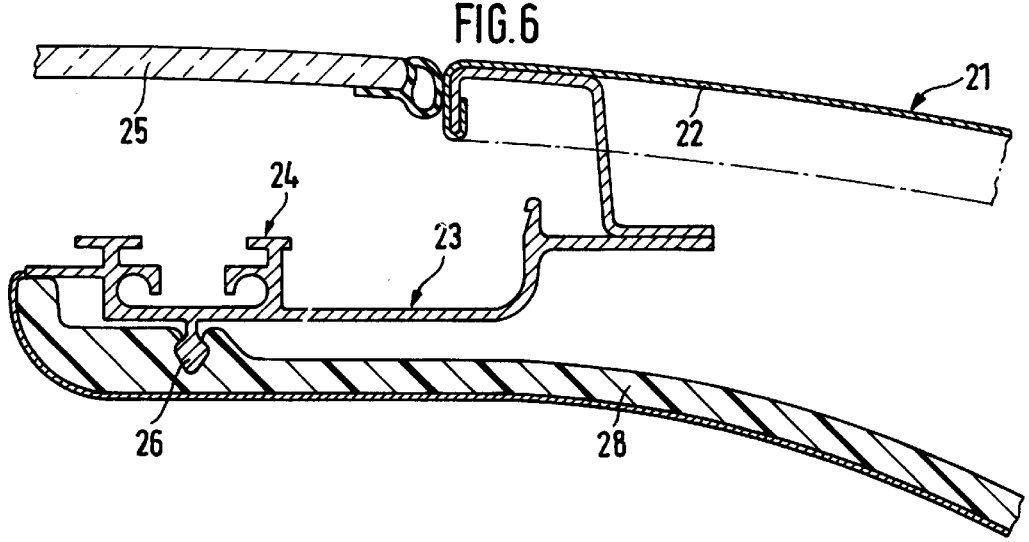
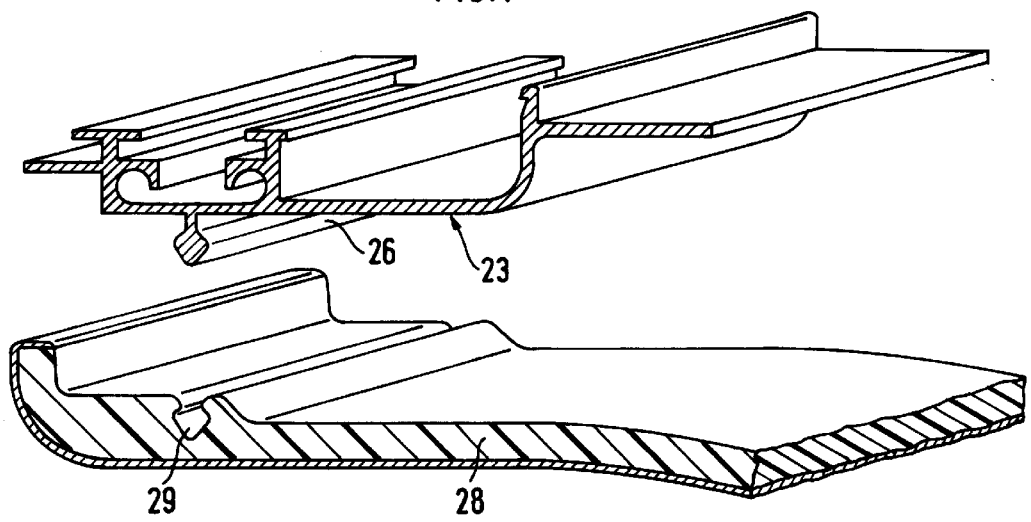

VEHICLE ROOF

BACKGROUND OF THE INVENTION

The invention relates to a vehicle roof in particular for motor vehicles and a motor vehicle comprising a vehicle roof.

The preferred area of application of the invention is vehicle roof modules that are made separately from the vehicle body and only joined to the vehicle body in the automobile plant on the assembly line. This type of vehicle roof module is enjoying increasing significance in particular because of the considerable shortening of the assembly time on the assembly line. If these types of vehicle roof module are fitted with an integrated sliding roof, then separate manufacture allows the advantageous option of checking the functions of the pre-fitted sliding roof unit before the roof module is combined with the bodywork.

With one of this type of known vehicle roof (DE 197 09 016 A1) the headliner is either an inseparable part of the foam inside skin applied to the roof skin or is fixed to the sliding roof frame if a sliding roof unit is present. In any case in neither is there any exchangeability of the headliner, which however can be desirable on several grounds. In such a way the headliner could be made to suit different interior finishings of the vehicle, without the need to have different complete roof modules made for them. As well as this, the exchangeability of a damaged or dirty headliner is desirable without having to remove the complete roof module.

SUMMARY OF THE INVENTION

Accordingly the purpose of the invention is to provide a vehicle roof, with or without a sliding roof unit, in which the headliner is exchangeable.

The stated purpose is fulfilled by a vehicle roof in accordance with the present invention in which the headliner has interlocking elements for making a releasable connection. The headliner can be easily attached by means of interlocking fasteners and removed without causing damage by releasing the interlocking fasteners. In addition to making the exchange of the headliner possible, it also allows the roof module to be handled without the headliner, which means the attachment to the vehicle body is made easier. Subsequently, a headliner fashioned in any required style to suit the interior finishings can then be fitted to the roof assembly.

For the purpose of the present invention, the term "sliding roof" used here singly or in word combinations does not only include such types in which the cover after dropping its rear edge is slid under the fixed rear roof surface to reveal the roof opening, but also tilting sliding roofs in which in addition the cover can be swivelled about a pivoting axis near its front edge to open out over the fixed roof surface from its closed position. Front-hinged ventilation flap type opening covers and the so-called over-roof sliding roofs, in which the roof, after lifting its rear edge, partially slides over the rear fixed roof surface to reveal the roof opening are also to be included. Also included are all types in which a sliding roof frame is attached under the fixed roof surface.

The interlocking elements on the roof module or on the sliding roof frame as appropriate and on the headliner can be designed in various forms. Thus they can each be a pair comprising a location recess and an interlocking projection. To achieve this, the location recess can be undercut while the interlocking projection has a corresponding thickened portion.

The location recess can have a constant width over its height or depth if the interlocking projection has a profile which permits a frictional engagement with the recess, for example with a so-called christmas tree profile. Location recesses and interlocking projections can each have mutually interlocking profiles.

The interlocking elements can also consist of pairs of location recesses into which separately manufactured interlocking elements that fit into both location recesses are inserted to interlock with both recesses. The location recesses can be in the form of slots and the interlocking projections in the form of ribs, i.e. both are appropriately elongated. Furthermore, location recesses and interlocking projections can be positioned at points at the appropriate spacing in relation to one another and can provide an adequately secure fastening for the headliner.

It is advantageous in accordance with some embodiments for the recesses to be formed inside the plastics foam or where appropriate the inner skin and/or the headliner. Accordingly the interlocking projections can be formed of plastics foam or as appropriate from the inner skin or be formed into the inner skin and/or the plastics foam of the headliner and be formed in one piece with it. Molded location recesses and exterior formed interlocking projections render separately attached interlocking elements superfluous and make the tool-less handling of the headliner very much easier.

If the vehicle roof module has a sliding roof unit, the sliding roof frame is preferably normally manufactured from extruded aluminium sections and allows the interlocking elements on the frame side to be already molded or formed so that the headliner alone is fitted with complementary interlocking elements.

The exchangeability of the headliner created by the invention also allows a notable secondary advantage in that the roof module without the headliner can be temporarily placed on the vehicle body and can be painted together with the bodywork without the headliner becoming damaged. To allow this advantageous possibility, the inner skin of the roof module is preferably fitted with temporary foamed and later removable spacers. For a secure temporary support of the roof module on the vehicle body, it is an advantage if, in accordance with some embodiments the spacers are fitted with foamed snap-in clips for releasable attachment to the inner edges of the vehicle body frame.

BRIEF DESCRIPTION OF THE DRAWINGS

Further details of the invention are more closely explained on the basis of the following various embodiments and partially schematic drawings. The drawings show:

FIG. 1 A perspective view of a vehicle roof without a sliding roof unit,

FIG. 2 the part section corresponding to the section line II—II in FIG. 1 representing a first embodiment of the interlocking elements, FIG. 3 a part section similar to FIG. 2 representing a second embodiment of the interlocking elements, FIG. 4 a part section similar to FIG. 3 with a swivelling and separable spacer, temporarily foamed on to the inner skin FIG. 5 a perspective view of a vehicle roof with a sliding roof unit, FIG. 6 the part section corresponding to the section line VI—VI in FIG. 1 representing a first embodiment of the interlocking elements, FIG. 7 a part section and part perspective exploded view of the sliding roof unit represented in FIG. 6 and the headliner to be attached to it, FIG. 8 a part section similar to FIG. 6 representing a second embodiment of the interlocking elements and FIG. 9 a part section and part perspective exploded view of the sliding roof frame represented in FIG. 8 and the separated interlocking elements and the headliner.

FIGS. 2, 3, 6 and 8 show finished assembled vehicle roof modules with the appropriate securely attached headliners.

DETAILED DESCRIPTION OF PREFERRED EMBODIMENTS

Figure 8:
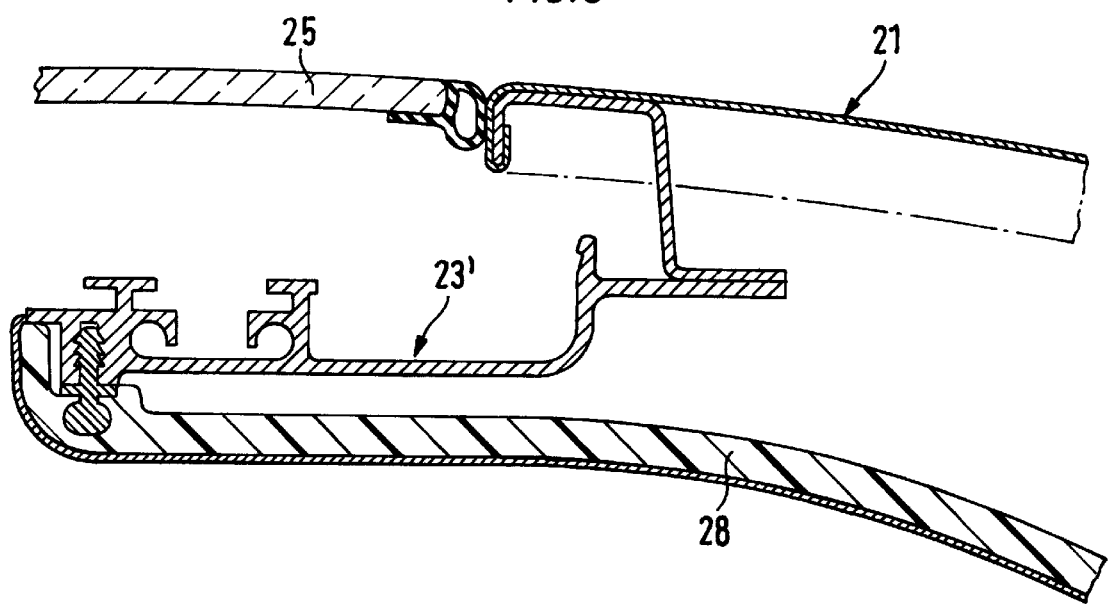

FIGS. 2 and 3 each show a roof module 1 with a rigid roof skin 2, that can be made from a drawn metal sheet, for example aluminium sheet or from a vacuum formed plastic film, and which has a foamed inner skin 3 on its inner surface. Materials suitable for the inner skin 3 are rigid polyurethane-based foams, which can be internally reinforced by adding fibres, e.g. glass fibre pieces, to the plastic before foaming. Textiles, knitted materials, non-woven fabrics and the like are also suitable as reinforcement. The application of the foam on to the reinforced inner skin 3 extending to an edge fold 4 in the roof skin 2 creates a laminated composite roof module with high deformation resistance and strength. All inner faces of the inner skin 3 including the interlocking elements described later are formed during the foaming process by an appropriate shaping of the foam mold. Thus the edge area around the edge fold 4 of the inner skin 3 with which it is placed on the vehicle body frame 5 has a recessed location slot 6 in which there is an adhesive sealing strip 7 attached and the roof module 1 sealed against the vehicle body frame 5.

On the underside of the inner skin 3 there are projections 8 into which the variously shaped location recesses 9 and 10 appropriate to the embodiments shown in FIGS. 2 to 4 are molded. While the location recess 9 in the embodiment in accordance with FIG. 2 widens towards the inside by means of an undercut, the location recess 10 has a substantially constant width over its height or depth. Both location recesses 9, 10 have chamfers 11 at their open ends, which make the complementary interlocking projections easier to align.

Associated with the roof module 1 configured as above is a separately manufactured headliner 12, which in the embodiments shown in FIGS. 2 and 3 is pre-formed from a plastics foam and covers the areas of the vehicle body frame 5. The connection of these areas with the vehicle body frame can be provided by a connecting weatherstrip 13 shown diagrammatically in FIGS. 2 and 3 in outline. The connection can also be a hollow cell section for sealing the adjacent vehicle door (not shown) against the vehicle body frame 5. The headliner 12 covering much of the area of the inner skin 3, where necessary under a pre-stress due to its shape, can also be formed from a plastics foam, for example one based on PUR. Furthermore the plastics foam of the headliner 12 can be reinforced in the manner described with reference to the inner skin 3. The headliner 12 is given a decorative finish on its underside, for example with a textile coating 14 or with a plastic film.

The upper surface of the headliner 12 has complementary foamed projections 15 opposite the projections 8 on the inner skin 3, on which with reference to FIGS. 2 and 3 the interlocking projections 16 or 17 respectively have different shapes. The locations of the interlocking projections 16, 17 on the headliner 12 are precisely determined to match the locations of the location recesses 9 or 10 on the inner skin 3, so that the interlocking elements can exactly engage with one another. The interlocking projection 16 shown on FIG. 2 has a thickened head to match the undercut on the location recess 9, so that when the headliner 12 is attached to the inner skin 3, a tight fitting engagement between the interlocking projection 16 and location recess 9 is achieved.

The interlocking projection 17 shown in FIG. 3 has a christmas tree profile which allows the interlocking projection to achieve a frictional connection with the location recess 10. The location recess 9 can also have a complementary corresponding profile to create a tightly fitting connection between the engaged surfaces on the interlocking projections and on the location recesses. The interlocking elements shown in FIGS. 2 and 3 can have the reverse arrangement with respect to their location, i.e. the location recesses can be moulded into the projections 15 of the headliner 12 whilst the interlocking projections 8 can be formed on to projections of the inner skin 3.

Also in the embodiments shown in FIGS. 1 to 4, the location recesses 9, 10 can be slots and the interlocking projections 16, 17 can be ribs. In addition, the location recesses 9, 10 and the interlocking projections 16, 17 can only be positioned at individual locations certain distances apart.

The roof module 1' shown in FIG. 4 has the characteristic that on the outer edge of the inner skin 3' a spacer 19 is foamed on to the inner skin 3' with a flexible section 18 where the material is thinned, i.e. a so-called film hinge. The ability of the spacer 19 to swivel in relation to the inner skin 3' is indicated in FIG. 4 by the spacer shown in dash dot lines rotated about the flexible section 18. The spacer 19 has a one piece sprung snap-in clip 20, which can be clipped to the inner edge of the vehicle body frame 5 as shown in FIG. 4. The embodiment of the roof module 1' shown in FIG. 4 allows the painting of the vehicle body and the roof skin 2 of the roof to be carried out at the same time. Here the roof module 1' does not seat directly on the vehicle bodywork 5 but on a spacer 19 which can be swung inwards. For the painting process, the headliner is not attached to the inner skin 3' and therefore cannot become damaged by the painting process. Of course there are at least as many similar spacers 19 on the opposite side with snap-in clips 20. After painting, the snap-in clips 20 for locating the roof module 1' are released from the vehicle body frame 5. The spacers 19 are then taken off at the flexible sections 18.

In the embodiments shown in FIGS. 5 to 9, the vehicle roof 21, which is similar to that described with reference to FIGS. 1 to 4, can also be made as a roof module with a sliding roof unit and be designed for fixing to a vehicle body frame. In the example in the drawing, a sliding roof frame 23 fixed in the roof skin 22 is part of this sliding roof unit and has guide rails 24 for guiding the functional and drive elements (not shown) for the sliding cover 25. In embodiments shown in FIGS. 6 and 8, the sliding cover 25 is a glass cover but it could also commonly be a metal plate. The inner surface of the roof skin 22 can likewise be foamed as an inner skin made from plastic as is indicated in FIGS. 6 and 8 in dash dot lines. FIGS. 6 and 8 show the sliding cover 5 in its closed position. In this embodiment, the headliner 26 is joined to and can be removed from the sliding roof frame 23 in a manner described later.

The sliding roof frame 23 is formed from an extruded aluminium section on which not only the guide rails 24 are formed by the extrusion process but also a downward projecting continuous rib-shaped interlocking projection 26, which similar to the embodiment shown in FIG. 2 has a thickened head. In the embodiment shown in FIGS. 8 and 9, a continuous slotted recess 27 pointing downwards is formed in the shape of the sliding roof frame 23' during the extrusion process.

The headliner 28 in both embodiments shown in FIGS. 6, 7 and 8, 9 is pre-formed from a special plastics foam which also in this case can be a plastic based on PUR with internal reinforcement as has been described in relation to the previous embodiments. The headliner 28 has a location recess 29 on its upper side complementary with the interlocking projection 26 and open upwards to accept the interlocking projection 26. The attachment of the headliner 28 to the sliding roof frame 23 is done with an exact engagement of the location recess 29 with the interlocking projection 26.

Figure 9:
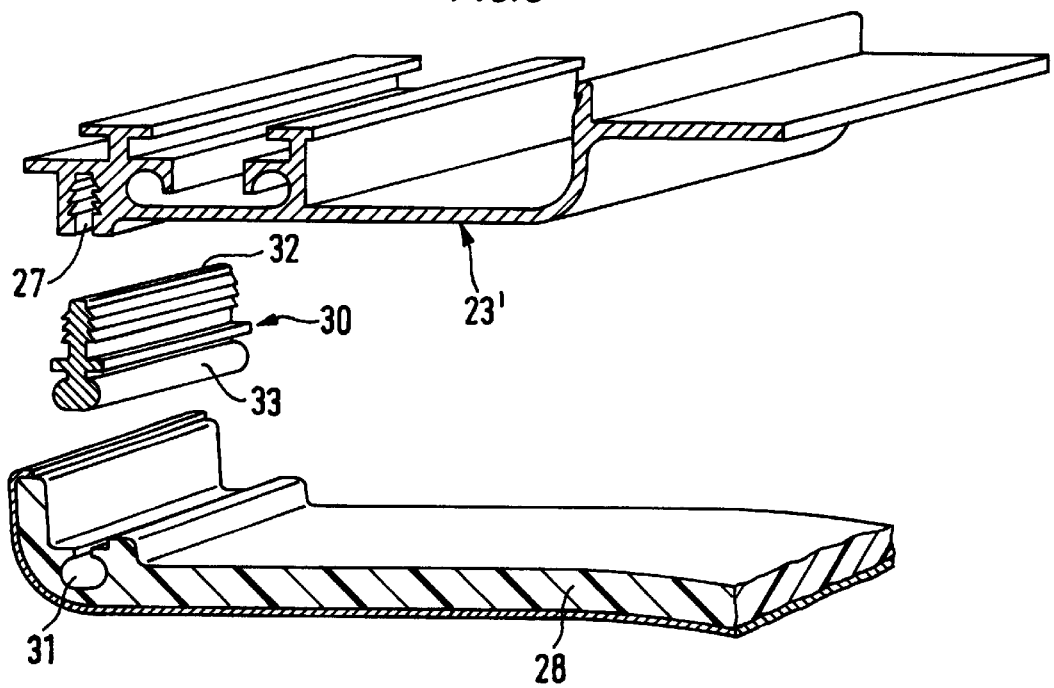

The embodiment shown in FIGS. 8 and 9 has a separate interlocking element 30 which engages with the slotted location recess 27 in the sliding roof frame 23' as well as with a slotted location recess 31 in the headliner 28. For this, the sides of the interlocking element 30 have rib-shaped continuous interlocking projections 32 and 33. These can be shaped to provide a tight fit or a friction fit engagement into the corresponding slotted location recesses 27, 31, which are self-evidently shaped to suit the relevant interlocking projections. In the example on the drawing, the location recess 31 and the interlocking projection 33 are formed somewhat like the embodiments described in FIG. 2. The location recess 27 and the associated interlocking projection 32 are somewhat like the embodiment described in FIG. 3. Self-evidently the embodiments shown in FIGS. 2 and 3 can also have a separate interlocking element, which engages into the associated location recesses of the inner skin and headliner.

When joining the parts shown in FIG. 9, the separate interlocking element 30 can first be interlocked with the slotted location recess 31 of the headliner 28 before the parts 28, 30 joined in this manner are attached to the sliding roof frame 23'. However, assembly can take place in the reverse sequence in which the separate interlocking element 30 is first attached to the sliding roof frame 23', before attachment to the headliner 28.

The proposal is a vehicle roof intended in particular for motor vehicles and in particular a roof module to be made separately from the bodywork and to be combined with the bodywork, consisting essentially of a rigid roof skin, where appropriate with an applied foam inner skin made from plastics foam and a decorative plastics foam headliner. The roof module can be fitted with an integral sliding roof unit. The characteristic feature is that the headliner is manufactured separately from the roof module 1 and can be attached to the inner skin or the sliding roof frame of the sliding roof unit as appropriate by means of releasable complementary accurately located interlocking elements, i.e. it is exchangeable.

While the invention has been described and illustrated by way of preferred embodiments of the invention, it will be understood to those skilled in the art that various changes in form and detail may be made without departing from the spirit and scope of the invention as defined in the appended claims.

What is claimed is:

1. A vehicle roof for motor vehicles, comprising:

a rigid roof skin having an exterior surface and an interior surface;

an inner plastic skin secured to the interior surface of the rigid roof skin, the inner plastic skin and rigid roof skin cooperating to form a self-supporting roof structure, the inner plastic skin having first interlocking elements formed as part of the inner plastic skin;

a headliner comprising a plastic foam having a first surface and a decorative surface adapted to face toward the interior of the vehicle, the headliner first surface including second interlocking elements formed as part of the headliner that cooperate with the first interlocking elements on the inner plastic skin such that the headliner is releaseably connected to the inner plastic skin; and at least one spacer connected with the inner skin having a flexible section of relatively thin cross section, the spacer being pivotable relative to the inner skin into a position to provide a temporary support on a vehicle body frame component.

2. The vehicle roof of claim 1, wherein one of the first and second interlocking elements comprise location recesses and the other of said interlocking elements comprise projections.

3. The vehicle roof of claim 2, wherein the recesses widen in a direction from an opening of the recesses toward an inside of the recesses and include a reduced dimension at the opening, the corresponding projections having a thickened head portion that cooperates with the reduced dimension to maintain the projections within the recesses.

4. The vehicle roof of claim 2, wherein the interlocking projection includes a triangular configuration that engages the recess to provide a frictional connection.

5. The vehicle roof according to claim 1, wherein the first and second interlocking elements comprise recesses and including cooperating projections having oppositely facing portions that fit into the recesses, respectively.

6. The vehicle roof of claim 1, wherein one of the interlocking elements is a slot and the other interlocking element is a projection rib.

7. The vehicle roof of claim 1, wherein the interlocking elements of the inner plastic skin are formed as part of the inner plastic skin and wherein the interlocking elements of the headliner are formed as part of the headliner.

8. The vehicle roof of claim 1, wherein the spacer is selectively removable at the flexible section.

9. The vehicle roof of claim 1, wherein the flexible section of the spacer is frangible.

10. The vehicle roof of claim 1, wherein the spacer includes portions adapted to releaseably engage a corresponding edge on the vehicle frame.

* * * * *